(No Model.) 2 Sheets—Sheet 1.

L. HENKLE.
INCANDESCENT GAS BURNER.

No. 405,736. Patented June 25, 1889.

WITNESSES:

INVENTOR
Leonard Henkle
BY
W. W. Canfield
ATTORNEY (No Model.) 2 Sheets—Sheet 2.
L. HENKLE.
INCANDESCENT GAS BURNER.

No. 405,736. Patented June 25, 1889.

Witnesses
Ira R. Steward
J. M. Delancey

Inventor
Leonard Henkle
By his Attorney W. W. Canfield

UNITED STATES PATENT OFFICE.

LEONARD HENKLE, OF ROCHESTER, NEW YORK.

INCANDESCENT GAS-BURNER.

SPECIFICATION forming part of Letters Patent No. 405,736, dated June 25, 1889.

Application filed March 1, 1889. Serial No. 301,652. (No model.)

*To all whom it may concern:*

Be it known that I, LEONARD HENKLE, a citizen of the United States, and a resident of Rochester, in the county of Monroe and State of New York, have invented certain new and useful Improvements in Incandescent Gas-Burners, of which the following is a specification.

My invention involves the use of a finely woven or braided platinum-wire basket, cone, or thimble, in combination with a compound burner for burning gas and air or in connection with an ordinary burner designed for the combustion of fuel-gas, water-gas, or any other gaseous substance capable of producing a high degree of heat, by which the platinum cone or thimble can be maintained at a high degree of incandescence; and it consists of the construction, combination, and arrangement of parts disclosed in the following specification, reference being had to the accompanying drawings, which form a part thereof, and in which similar letters of reference indicate like or equivalent parts wherever found throughout the several views.

Figure 1:
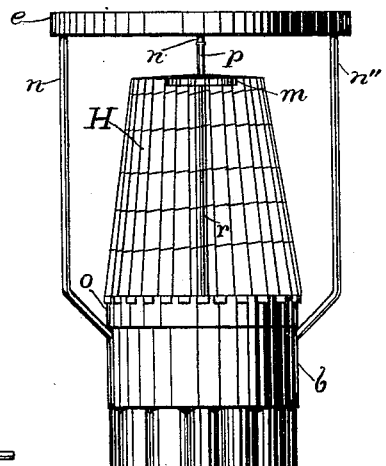
Figure 2:
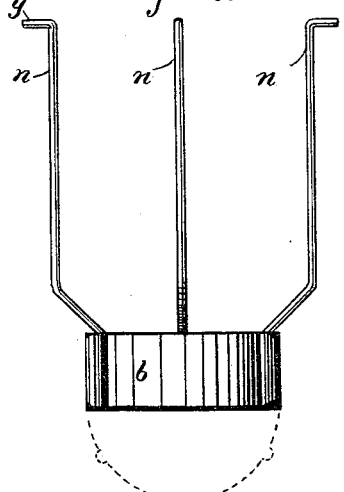
Figure 3:
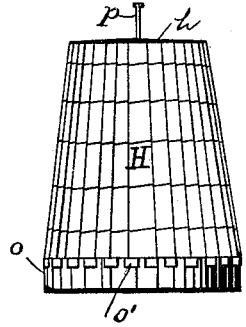
Figure 4:
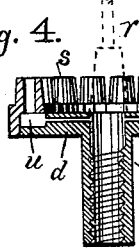
Figure 5:
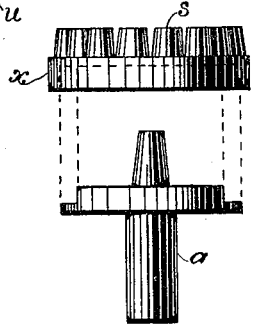
Figure 6:
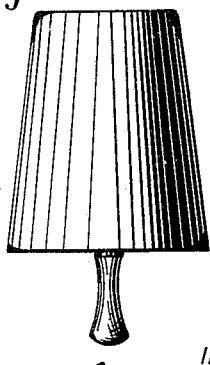
Figure 1:
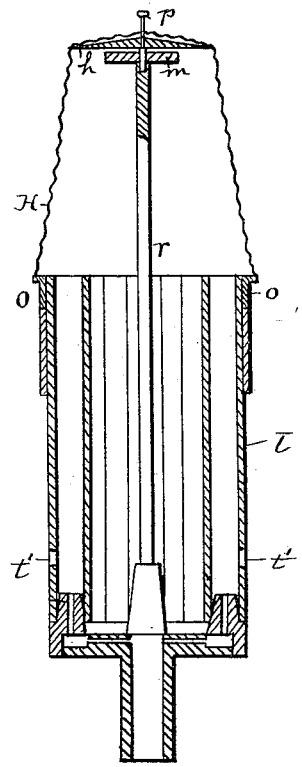
Figure 8:
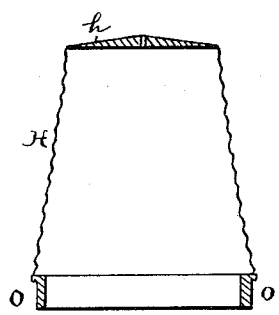

Figure 1 represents my improved incandescent gas-burner in elevation. Fig. 2 represents a chimney-holder used in connection therewith. Fig. 3 represents the platinum cone or thimble employed by me, and Figs. 4 and 5 represent details in the construction of my improved burner. Fig. 6 represents an article frequently employed in connection therewith. Fig. 7 is a central vertical section of the construction shown in Fig. 1; and Fig. 8 is a modification of the form of the platinum-wire cone or thimble, also shown in Fig. 1.

Referring to Fig. 1 of the drawings, A indicates the body of the burner, which is composed of a series of hollow tubes $t$, each of which is provided with small holes or perforations $t'$ near the bottom, as shown. The tubes $t$ are attached to the burner-head, (shown in Fig. 4,) which consists of a base portion $d$, provided with a screw-threaded shank or socket $a$, by which the burner may be attached to an ordinary gas pipe or fitting, and an annular band $x$, which is united to the base portion in any desired manner. Within the outer or annular portion of the base $d$ is formed an annular chamber $u$, which communicates with the gas-passage in the socket $a$ by means of small passages $c$ through arms attached to the socket and forming part of the burner-head, and between these arms are open spaces, through which air passes to the inner surface of the burner in the well-known way.

$s$ indicates a series of small short tubes firmly attached to the burner-head and communicating with the annular chamber $u$. One of these short tubes fits within each of the burner-tubes $t$ when the latter are in place, and the top thereof should extend up to or slightly above the holes $t'$.

H indicates a cone or thimble formed from platinum wire woven or braided into the desired shape, and the bottom of this cone is provided with a metallic band $o$, having small hooks $o'$, to which the strands or threads of platinum wire are attached. Small perforations may be substituted for the hooks $o'$, if desired. The threads or wires of platinum from which the cone H is formed may be attached at the top to a mica plate $h$, as shown in Fig. 8, or be carried up and united at the top in the ordinary basket form, these details constituting no part of this invention.

A rod $r$, attached to the center of the burner-head, as shown in dotted lines in Fig. 4, extends up centrally within the burner, and upon or near the top of this rod is placed a small plate $m$, preferably of mica or platinum, the object of which is to retain the top of the cone in its proper position and prevent, as much as possible, the crushing or indentation of the same, in which the mica or platinum plate $h$ also aids when the latter is used.

In Figs. 1 and 2 I have shown a chimney-holder particularly adapted to this style of incandescent burner. It consists of a band $b$, provided with spring wires or rods $n$, attached thereto in any desired manner and being curved outwardly and extended upwardly, as shown, and of an annular band $e$, attached to said rods and supported thereby. Each of the rods $n$ is provided at its top with a short projecting portion $y$, which extends outwardly at right angles to the vertical portion thereof, and the band $e$ is provided on its inner surface with small holes or perforations, which are designed to receive the outwardly-projecting portions $y$ of the rods $n$. The band $e$ is placed in position by simply taking hold of the rods $n$ and pressing them together until the projections $y$ will pass within the band, and are brought opposite the holes in the inner surface thereof, when, upon releasing the rods, the projections $y$ will enter said holes and the band $e$ will be held firmly in position.

The platinum cone or thimble is extremely frail and delicate and liable to be crushed out of shape by the slightest touch, and this would be liable to occur every time the chimney was removed or put on if an ordinary chimney-holder were employed. By the use of my improved holder, however, all this is avoided. The end of the chimney is placed within the band $e$ from above, and the rods $n$ guide it as it is passed down over the cone, and it is impossible for the chimney to strike or come in contact therewith, and the same is true when the chimney is removed.

When the platinum cone is in position upon the burner, the band $o$ surrounds the top thereof, and the circular row of tubes which composes the burner open just within said band. This band serves to keep the cone in position upon the burner around the combustion-chamber, and to maintain the base thereof in a circular shape. If, however, the body of the cone should be crushed, indented, or otherwise gotten out of symmetrical form by handling, shipping, or otherwise, a small conical-shaped block, similar to that shown in Fig. 6, inserted through the base-ring $o$ and pressed gently upward to the top of the cone, will restore it to its original and proper shape, and this may be done as often as necessary. The cone may be removed from the burner whenever desired by taking hold of the pin P, secured to the top of the cone, and which extends down into the top of the rod $r$, which is hollow at the end for this purpose, and pressing upwardly upon the band $o$ until it slips from over the burner-tubes. The pin P is also provided with a shoulder or enlarged portion, which fits within the top of the rod $r$, and on which the plate $h$ rests. The band $b$ of the chimney-holder serves as a support for the band $o$ of the cone and prevents the same from slipping downward.

The operation is as follows: Gas enters the tubes $t$ by the passages $v$ in tubes $s$, and air enters through the holes $t'$ in the tubes $t$ in the desired amount. The mingled gas and air is ignited at the top of the tubes $t$ within the cone H, which constitutes the combustion-chamber. The mingling of the gas and air before ignition produces, as in the ordinary Bunsen burner, almost perfect combustion, and the additional supply of air inside and outside, as in the ordinary Argand burner, adds to this effect. The result is a very high degree of heat with but little, if any, visible flame. The platinum basket or cone is at once raised to a high degree of incandescence and remains in a highly-luminous condition as long as the burner is ignited.

I am aware that it has been proposed to construct a burner with a screw-threaded rod extending centrally above the same and to mount a disk having a screw-threaded aperture to engage said rod above the burner and to suspend a platinum incandescent in the form of an inverted frustum of a cone open at both ends upon said disk. Such construction I do not claim.

Having fully described my invention, its construction, and application, I claim and desire to secure by Letters Patent—

1. The combination, with an Argand gas-burner, of the platinum cone or thimble and the central rod $r$, the cone or thimble being provided with the band $o$ and the pin P, substantially as shown and described.

2. The combination, with an Argand gas-burner, of a platinum cone or thimble and a chimney-holder provided with the band $e$, and three or more straight equidistant supporting-arms, the arms and band inclosing the cone or thimble, substantially as shown and described.

3. The combination, with a gas-burner, of the chimney-holder provided with the band $b$ and the platinum cone provided with the band $o$, supported by the band $b$, substantially as shown and described.

4. The combination of an Argand gas-burner, a platinum cone having a top, a rod extending centrally within the cone, and the supporting button or plate on said rod holding the top of the cone at a determined elevation, substantially as shown and described.

5. The combination, with an Argand gas-burner, of the platinum cone or thimble having a top, a rod extending centrally within the cone, a plate $m$ of less extent than the top of the cone on said rod, and a plate of greater extent than plate $m$, supported on plate $m$ within the cone and holding the top of the cone at a determined elevation, substantially as shown and described.

6. The combination, with an Argand gas-burner, of the central rod $r$ and the platinum cone or basket, said rod and cone being provided at their tops one with a socket or cavity and the other with an attachment having a pin or projection which enters said socket or cavity, substantially as and for the purpose set forth.

7. The combination, with an Argand gas-burner, of a rod extending centrally above said burner and a platinum cone or thimble resting removably on the top of said rod and pivotally connected therewith, substantially as shown and described.

8. The combination, with an Argand gas-burner, of a rod extending centrally above the same, and a platinum cone or thimble the base of which surrounds the top of the burner and the upper end of which rests removably on the top of the said rod, substantially as described.

Signed at Rochester, in the county of Monroe and State of New York, this 26th day of February, A. D. 1889.

LEONARD HENKLE.

Witnesses:
L. BONESTEEL,
P. CHAMBERLAIN, Jr.